US007686158B2

(12) United States Patent
Tao et al.

(10) Patent No.: US 7,686,158 B2
(45) Date of Patent: Mar. 30, 2010

(54) BELT-CONVEYOR DEVICE AND IMAGE FORMING APPARATUS

(75) Inventors: Satoru Tao, Ibaraki (JP); Yoshihiko Sano, Ibaraki (JP); Susumu Saito, Ibaraki (JP); Shunichi Oohara, Ibaraki (JP); Nobuyuki Furuya, Ibaraki (JP)

(73) Assignee: Ricoh Company, Limited, Tokyo (JP)

( * ) Notice: Subject to any disclaimer, the term of this patent is extended or adjusted under 35 U.S.C. 154(b) by 527 days.

(21) Appl. No.: 11/610,775

(22) Filed: Dec. 14, 2006

(65) Prior Publication Data

US 2007/0144871 A1 Jun. 28, 2007

(30) Foreign Application Priority Data

Dec. 28, 2005 (JP) ............................ 2005-380240

(51) Int. Cl.
*B65G 39/16* (2006.01)

(52) U.S. Cl. ................... 198/807; 198/810.03; 399/303

(58) Field of Classification Search ................. 198/806, 198/807, 810.03; 399/299, 302
See application file for complete search history.

(56) References Cited

U.S. PATENT DOCUMENTS 4,959,040 A * 9/1990 Gardner et al. .............. 474/103
5,248,027 A 9/1993 Kluger et al.
5,479,241 A * 12/1995 Hou et al. ..................... 399/75
5,960,936 A * 10/1999 Kuehnle et al. ............. 198/807
5,964,339 A * 10/1999 Matsuura et al. ....... 198/810.03
6,141,526 A 10/2000 Ikeda
6,786,325 B2 * 9/2004 Powell ....................... 198/807
2003/0129000 A1 7/2003 Lee et al.
2005/0150747 A1 * 7/2005 Menendez et al. ..... 198/810.03
2006/0289280 A1 * 12/2006 Furuya et al. ............... 198/806

FOREIGN PATENT DOCUMENTS

EP 0 437 204 A2 7/1991
EP 0 679 018 A2 10/1995
JP 10-139202 5/1998
JP 11-193143 7/1999
JP 11-295948 10/1999
JP 2000-34032 2/2000
JP 3088390 7/2000

(Continued)

OTHER PUBLICATIONS

U.S. Appl. No. 12/104,127, filed Apr. 16, 2008, Tao, et al.

(Continued)

*Primary Examiner*—Mark A Deuble
(74) *Attorney, Agent, or Firm*—Oblon, Spivak, McClelland, Maier & Neustadt, L.L.P.

(57) ABSTRACT

A belt-conveyor device includes a detecting unit that detects a belt position in a width direction of the endless belt for a plurality of times within more than a cycle of the endless belt, the width direction being a direction orthogonal to direction of travel of the endless belt; an average calculating unit that calculates an average belt position from the belt positions detected by the detecting unit; a storing unit that stores therein a plural sets of correction values and belt positions; and a meander correcting unit that corrects meander of the endless belt based on a correction value that corresponds with the average belt position in the storing unit.

12 Claims, 8 Drawing Sheets

FOREIGN PATENT DOCUMENTS

| | | | | |
|---|---|---|---|---|
| JP | 2000-250375 | | | 9/2000 |
| JP | 2002-287527 | | | 10/2002 |
| JP | 2005-1854 | | | 1/2005 |
| JP | 3633294 | | | 1/2005 |
| JP | 2005338522 | A | * | 12/2005 |

OTHER PUBLICATIONS

U.S. Appl. No. 11/839,841, filed Aug. 16, 2007, Tao, et al.
"Web Tracking Apparatus", 2244 Research Disclosure, No. 301, XP 000052475, May 1989, pp. 307-318.

* cited by examiner

| BELT-POSITION STORING TABLE | |
|---|---|
| AREA NO. | BELT-POSITION |
| 0 | 123 |
| 1 | 132 |
| : | : |
| 62 | 110 |
| 63 | 95 |

BELT-CONVEYOR DEVICE AND IMAGE FORMING APPARATUS

CROSS-REFERENCE TO RELATED APPLICATIONS

The present document incorporates by reference the entire contents of Japanese priority document, 2005-380240 filed in Japan on Dec. 28, 2005.

BACKGROUND OF THE INVENTION

1. Field of the Invention

The present invention relates to a belt-conveyor device and an image forming apparatus that includes the belt-conveyor device.

2. Description of the Related Art

A tandem system is widely employed in color image forming apparatuses such as color printers and color copiers. In the tandem system, a plurality of photoconductive drums are arranged in the travel direction of an endless transfer belt, a toner image is formed by adhering toners of different colors such as yellow, magenta, cyan, and black on an electrostatic latent image formed on each of the photoconductive drums, and the toner image of each color is transferred to the transfer belt in turn. A transfer belt driven by a belt-conveyor device sometimes gets biased or sometimes meanders, when travelling, in the direction orthogonal to its travel direction (in the width direction of the transfer belt). The meander of the transfer belt causes a relative position displacement of each toner image and a reduction in the image quality. Therefore, there is a need to have a means for controlling the transfer belt so that it does not meander.

There is known a system, as a method of controlling meander of a transfer belt, that controls an angle of inclination of a steering roller from a reference surface. The steering roller being one of that rollers that support the transfer belt (hereinafter, "steering system"). There is also known another system that adjusts and controls a tilt of an adjusted roller in a proportional relationship with respect to an amount of displacement in a position of an intermediate transfer belt (for example, see Japanese Patent Application Laid-open No. 2002-287527). In these systems, a transfer belt has a smaller load than in a system in which an edge of the transfer belt is guided to control a bias and is superior itself in durability. However, it is necessary to detect a belt position in the steering system, a transfer belt is likely to meander unless an angle of inclination of a steering roller is set based on a grasped correct belt position.

As described above, when printing starts while the transfer belt is meandering, relative position displacement occurs in toner images of yellow, magenta, cyan, and black, which causes a reduction in image quality. Furthermore, when meandering of the transfer belt does not converges for a long time, it takes long time to turn on an image forming apparatus or to become a printing possible condition from an operation of an image forming apparatus recovering from error, thereby causing a reduction in printing efficiency. Therefore, it is necessary to correct meander of a transfer belt and to return the meandering belt to an original condition as soon as possible.

With regard to detection of a belt position, because a shape of an edge of a transfer belt is nonlinear, the detected signal has a displacement component due to the shape of the edge. Thus, when detecting the belt position, the displacement component due to the shape of the edge of the transfer belt needs to be removed. The technologies that are currently available for removing the displacement component are as follows:

(1) A technology that averages belt position data by a cycle worth of a belt during driving a transfer belt to calculate a belt position (hereinafter, "a first conventional technology") (for example, see Japanese Patent Application Laid-open No. H11-193143).

(2) A technology that calculates a current belt position by arranging a belt home and its detecting unit and comparing the previously extracted shape of an edge of a transfer belt with detected belt position data, serving the belt home as a reference, to detect a reference position in the belt-travel direction (hereinafter, "a second conventional technology") (for example, see Japanese Patent Application Laid-open No. H10-139202). It needs time for a transfer belt to end a cycle at the maximum after starting driving the transfer belt to accurately get hold of a belt position in the first and the second conventional technologies.

Because time for a transfer belt to end a cycle is required, it is necessary to take time for a transfer belt to make a half cycle on average. Therefore, a transfer belt is likely to meander in a period to accurately get hold of a belt position. It needs time to converge meander velocity due to meander of a transfer belt. When the converging time of the meander velocity is long, it takes long time to turn on an image forming apparatus or to become a printing possible condition from an operation of an image forming apparatus recovering from error, thereby causing a reduction in printing efficiency.

Under a condition of not converging meander velocity, when stops of a transfer belt due to error occurrence are consecutively repeated many times and meander correction generated by activation of the transfer belt is not completed, another meander is generated, leading to an accumulation of the meander amount. As a result, durability of the transfer belt is considerably reduced, for example, the transfer belt comes into contact with a frame of a belt-conveyor device and is damaged.

SUMMARY OF THE INVENTION

It is an object of the present invention to at least partially solve the problems in the conventional technology.

According to an aspect of the present invention, a belt-conveyor device that includes an endless belt and a driving unit that drives the endless belt includes a detecting unit that detects a belt position in a width direction of the endless belt for a plurality of times within more than a cycle of the endless belt, the width direction being a direction orthogonal to direction of travel of the endless belt; an average calculating unit that calculates an average belt position from the belt positions detected by the detecting unit; a storing unit that stores therein a plural sets of correction values and belt positions; and a meander correcting unit that corrects meander of the endless belt based on a correction value that corresponds with the average belt position in the storing unit.

According to another aspect of the present invention, an image forming apparatus that includes a belt-conveyor device that includes an endless belt and a driving unit that drives the endless belt includes a detecting unit that detects a belt position in a width direction of the endless belt for a plurality of times within more than a cycle of the endless belt, the width direction being a direction orthogonal to direction of travel of the endless belt; an average calculating unit that calculates an average belt position from the belt positions detected by the detecting unit; a storing unit that stores therein a plural sets of correction values and belt positions; and a meander correcting unit that corrects meander of the endless belt based on a correction value that corresponds with the average belt position in the storing unit.

According to still another aspect of the present invention, a method of correcting meander travel of an endless belt that is driven by a driving unit includes detecting a belt position in a width direction of the endless belt for a plurality of times within more than a cycle of the endless belt, the width direction being a direction orthogonal to direction of travel of the endless belt; calculating an average belt position from the belt positions detected at the detecting; and correcting meander of the endless belt based on a correction value that corresponds with the average belt position that have been stored beforehand in a storing unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below with reference to the accompanying drawings.

Figure 1:
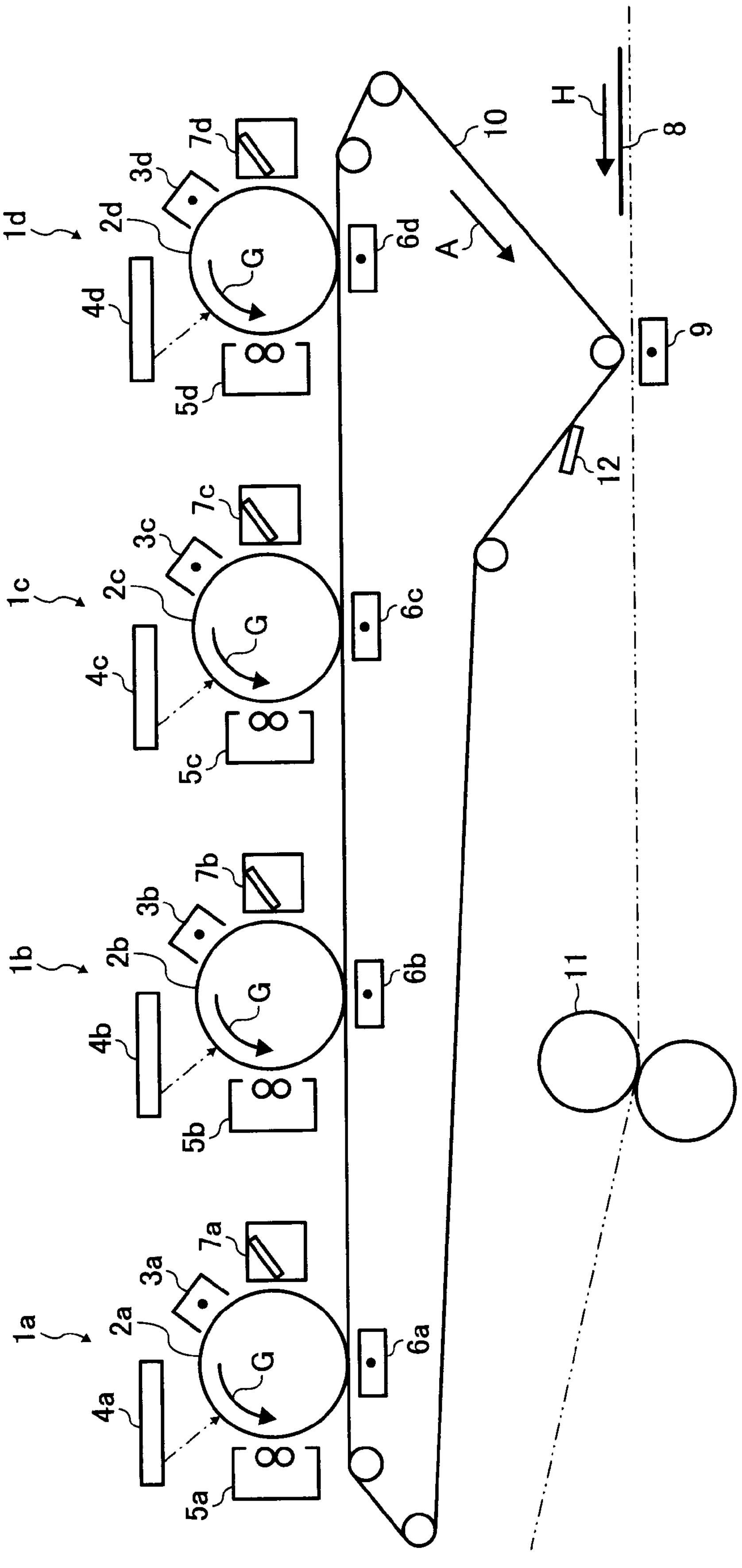
FIG. 1 is a schematic side view of an image forming apparatus that includes a belt-conveyor device according to an embodiment of the present invention.

FIG. 1 outlines a four-full-color image forming apparatus according to an embodiment of the present invention. The image forming apparatus includes four image forming units 1*a*, 1*b*, 1*c*, 1*d* arranged in the travelling direction of a transfer belt 10. The image forming unit 1*a* includes a photoconductive drum 2*a*, a drum charging device 3*a*, an exposure device 4*a*, a developing device 5*a*, a transfer device 6*a*, and a cleaning device 7*a*. The image forming units 1*b*, 1*c*, and 1*d* have the same structure as the image forming unit 1*a*. Thus, "b", "c", and "d" are utilized instead of "a" of the last letter of the sign in each component of the image forming unit 1*a* in FIG. 1 and each corresponding component in the image forming units 1*b*, 1*c*, and 1*d* is indicated and the explanation is omitted.

The image forming units 1*a* to 1*d* form different-color images, for example, the image forming unit 1*a* forms a yellow image, 1*b* forms a magenta one, 1*c* a cyan one, and 1*d* a black one. More specifically, when the photoconductive drum 2*a* receives a start indicating signal of an image forming operation from a controller (not shown), the photoconductive drum 2*a* starts rotating in the direction shown by an arrow G and keeps rotating until the image forming operation ends.

When the photoconductive drum 2*a* starts rotating, high voltage is applied to the drum charging device 3*a* and a negative electric charge is uniformly charged on a surface of the photoconductive drum 2*a*. When character data or figure data converted to a dot image is transmitted from a controller (not shown) to the image forming apparatus as an on/off signal of the exposure device 4*a*, part to which a laser beam is irradiated by the exposure device 4*a* and the other part to which a laser beam is not irradiated by the exposure device 4*a* are formed on the surface of the photoconductive drum 2*a*.

When part of the photoconductive drum 2*a* on which electric charge is reduced by irradiation of a laser beam from the exposure device 4*a* reaches a position opposing to the developing device 5*a*, a negatively charged toner is adhered to part of the photoconductive drum 2*a* on which electric charge is reduced, forming a toner image.

The toner image formed on the photoconductive drum 2*a* reaches the transfer device 6*a* and is then transferred on the transfer belt 10 that rotates in the direction of an arrow A by action of high voltage applied to the transfer device 6*a*. The photoconductive drum 2*a* that has passed the transfer position corresponding to the transfer device 6*a* passes, to remove a remaining toner and the like on the surface of the photoconductive drum 2*a*, a portion corresponding to the cleaning device 7*a* during which the drum is cleaned and is ready for next image forming operation.

The same image forming operation as in the image forming unit 1*a* is performed in the image forming unit 1*b* next to the operation of the image forming unit 1*a*. A toner image formed on the photoconductive drum 2*b* is transferred on the transfer belt 10 by the action of high voltage applied to a transfer device 6*b*. Then, timing at which the image formed in the image forming unit 1*a* and transferred on the transfer belt 10 reaches the transfer device 6*b* and timing at which the toner image formed on the photoconductive drum 2*b* is transferred on the transfer belt 10 are matched and therefore, the toner images formed in the image forming unit 1*a* and in the image forming unit 1*b* are overlapped on the transfer belt 10. Likewise, toner images formed in the image forming units 1*c* and 1*d* are overlapped on the transfer belt 10 to form a full-color image on the transfer belt 10.

At the same time, when the full-color image gets to a paper transfer device 9, a sheet 8 of paper that is an example of a sheet-shaped medium carried from a paper feeding part (not shown) of the image forming apparatus in the direction of an arrow H reaches the paper transfer device 9. The full-color image on the transfer belt 10 is transferred on the sheet 8 by the action of high voltage applied to the paper transfer device 9. The sheet 8 is carried to a fixing device 11 and the toner image on the sheet 8 is fused and fixed on the sheet 8. On the other hand, after the full-color image passes the paper transfer device 9, a toner that is not transferred is adhered on the transfer belt 10 and the toner is removed by a belt cleaning mechanism 12.

Figure 2:
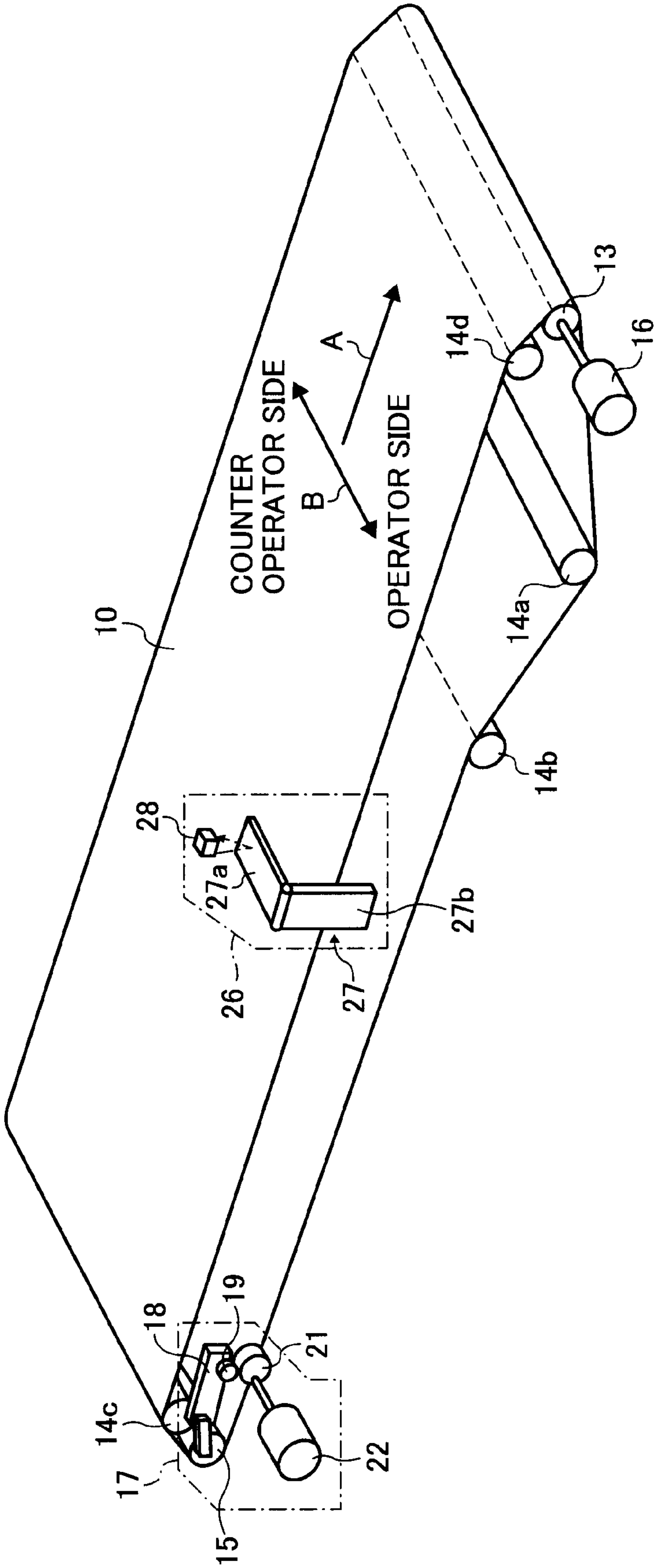
FIG. 2 is a perspective view of the belt-conveyor device shown in FIG. 1.

Next, a belt-conveyor device is explained. FIG. 2 is perspective of the belt transfer device that drives the endless transfer belt 10. The direction of an arrow A is referred to as a belt-travel direction and a direction of an arrow B is referred to as a belt-width direction in FIG. 2. This side of the arrow B is referred to as an operator side and that side of the arrow B is as a counter operator side.

The belt-conveyor device is mounted with a driving roller 13, driven rollers 14*a* to 14*d*, and a steering roller 15. The transfer belt 10 is laid across in a tensioned condition by these plural rollers. The driving roller 13 is connected to a belt driving motor 16 and the transfer belt 10 travels in the belt-travel direction by rotation of the belt driving motor 16. However, the transfer belt 10 meanders in the belt-width direction due to various factors such as distortion in the belt-conveyor device itself. When printing starts while the transfer belt 10 is meandering, yellow, magenta, cyan, and black toner images are deviated in position, which causes a reduction in image quality.

When the image forming unit 1*a* forms a yellow toner image, 1*b* forms a magenta toner image, 1*c* forms a cyan toner image, and 1*d* forms a black toner image, relative deviation in position of toner images generally becomes large in combination of yellow and black toner images. To provide an image of high quality, it is necessary that relative deviation in position of each toner image is equal to or less than 50 micrometers in the belt-width direction.

There are various factors that cause deviation of a toner image in position. When the transfer belt 10 reaches from the image forming unit 1*a* to the image forming unit 1*d*, deviation in position in the belt-width direction is required to be within 20 micrometers (μm) in correcting meander of the transfer belt 10.

Therefore, it is necessary to control the meander velocity of the transfer belt 10 within a range of allowed meander velocity all the time to suppress deviation of position in the belt-width direction during travel of the transfer belt 10. The range of allowed meander velocity is, for example, ±12 μm/s. The belt-conveyor device includes a meander correcting mechanism 17 to correct the meander of the transfer belt 10.

Figure 3:
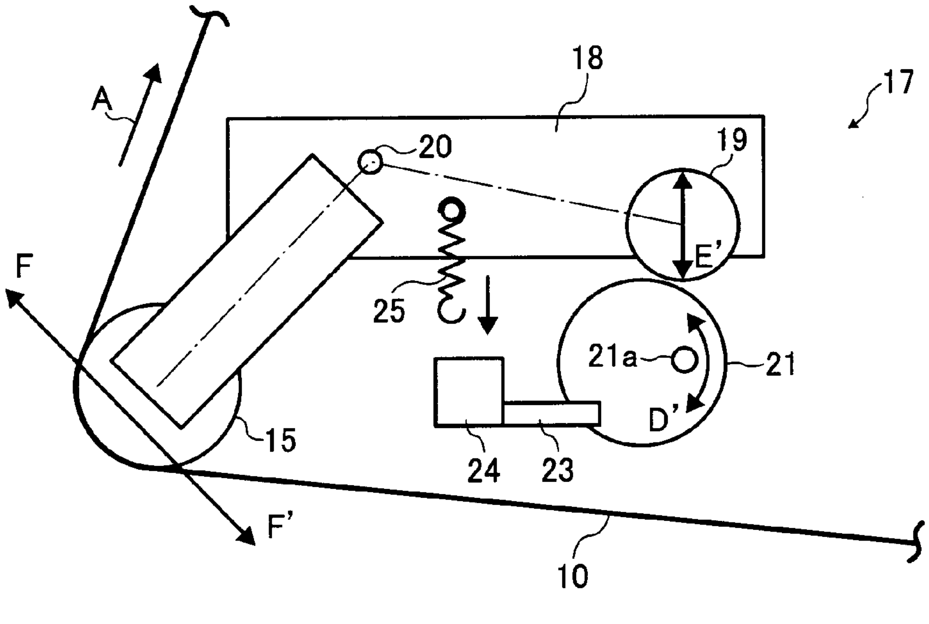
FIG. 3 side view of a meander correcting mechanism shown in FIG. 2.

With reference to FIG. 3, an explanation is given below about a principle of correcting the meander of the transfer belt 10. The meander correcting mechanism 17 includes a swinging arm 18. One end of the swinging arm 18 is connected to the operator side end of the steering roller 15. A bearing 19 is fixed to the other end of the swinging arm 18. The swinging arm 18 can swing about a swinging-arm rotating axis 20.

An eccentric cam 21 whose rotating axis 21*a* is located away from the center of the circle is arranged so as to come into contact with the bearing 19. A rotating axis of a steering motor 22 in FIG. 2 (not shown in FIG. 3) is connected to the rotating axis 21*a*. The eccentric cam 21 has a shielding board 23. An eccentric cam position detecting unit 24 detects a position of the shielding board 23 and can recognize a position of the eccentric cam 21.

Tension of a swinging arm spring 25 connected to the swinging arm 18 always keeps the eccentric cam 21 in contact with the bearing 19.

When the eccentric cam 21 rotates counterclockwise, that is, in the direction of an arrow D, the bearing 19 moves downward in the direction of an arrow E. Thus, the swinging arm 18 swings clockwise about the swinging-arm rotating axis 20. The counter operator side end of the steering roller 15 is fixed and only the operator side end of the steering roller 15 moves askew in the upper left direction of an arrow F through the rotation of the swinging arm 18 about the swinging-arm rotating axis 20.

That is to say, the steering roller 15 makes an inclination by the operator side end moving in the direction of the arrow F based on the angle at which the eccentric cam 21 rotates in the direction of the arrow D. Accordingly, the transfer belt 10 moves to the counter operator side at meander velocity according to the angle of inclination produced by the steering roller 15. On the contrary, when the eccentric cam 21 rotates clockwise, that is, in the direction of an arrow D', the bearing 19 moves upward in the direction of the arrow E' and only the operator side end of the steering roller 15 moves askew in the bottom right direction of an arrow F'. In this event, the transfer belt 10 moves to the operator side at meander velocity according to the angle of inclination of the steering roller 15.

By use of this principle, for example, when the transfer belt 10 begins to change to the operator side, the steering roller 15 is tilted to make the transfer belt 10 move to the counter operator side. On the other hand, when the transfer belt 10 begins to change to the counter operator side, the steering roller 15 is tilted to make the transfer belt 10 move to the operator side. As described above, the meander control of the transfer belt 10 is performed by properly controlling the direction of inclination and the angle of inclination of the steering roller 15 so that the meander velocity of the transfer belt 10 is always within a range of allowed meander velocity.

A belt position detecting mechanism 26 used in the belt-conveyor device of the embodiment is explained with reference to FIG. 4. The belt position detecting mechanism 26 detects a position of the belt in the width direction of the transfer belt 10 and includes an L-shaped contactor 27 and a displacement detection sensor 28. The displacement detection sensor 28 constitutes a belt-position detecting unit.

The L-shaped contactor 27 includes a lateral-direction member 27*a* and a vertical-direction member 27*b*. The lateral-direction member 27*a* and the vertical-direction member 27*b* are rotatably supported about a spindle 29 located at a site at which these members 27*a* and 27*b* intersect each other (can be swung bidirectionally as shown by arrows C in FIG. 4). One member 27*a* that constitutes the contactor 27 is mounted with a spring 30 and its tensility causes the other member 27*b* to be in contact with the edge of the transfer belt 10 all the time.

One displacement detection sensor 28 is arranged at a fixed member (not shown) near a free end side away from the spindle 29 of the member 27*a* of the contactor 27. The displacement detection sensor 28 can include a light emitting part and a light receiving part, for example, and detects a distance between a position of a reflected light that is emitted from the light emitting part, reflected at a measured object, and received at the light receiving part, and the measured object based on displacement of a reference position. Because such sensors are well known in the art, a detailed explanation of the displacement detection sensor 28 will be omitted.

Figure 4:
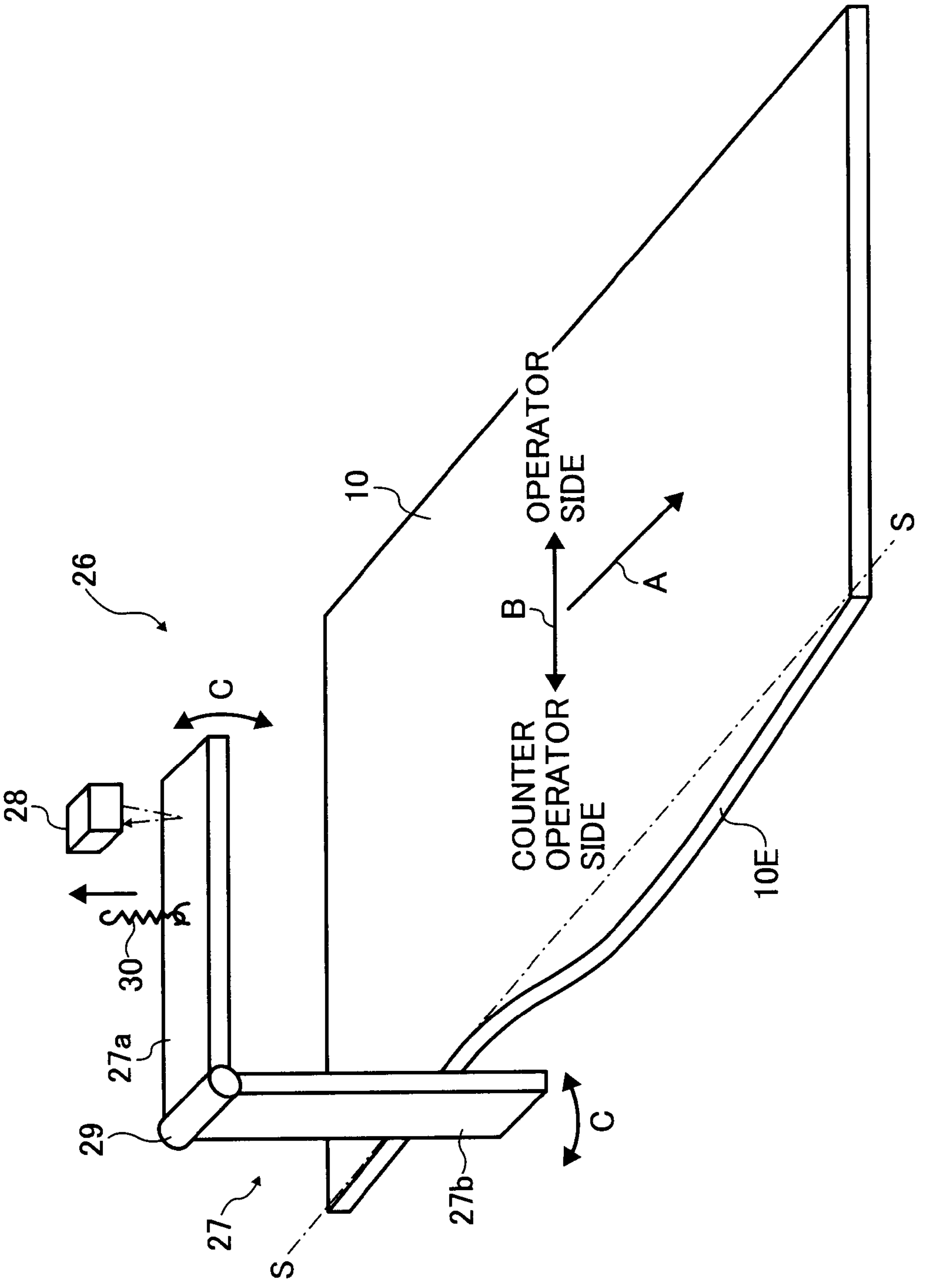
FIG. 4 is a perspective view of a belt position detecting mechanism.

As shown in FIG. 4, the shape of the edge 10E of the transfer belt 10 is nonlinear away from a straight line S-S shown for comparison due to a cutting difference. Therefore, the position of the belt detected by the displacement detection sensor 28 includes a displacement component due to the shape of the edge.

Figures 5, 6:
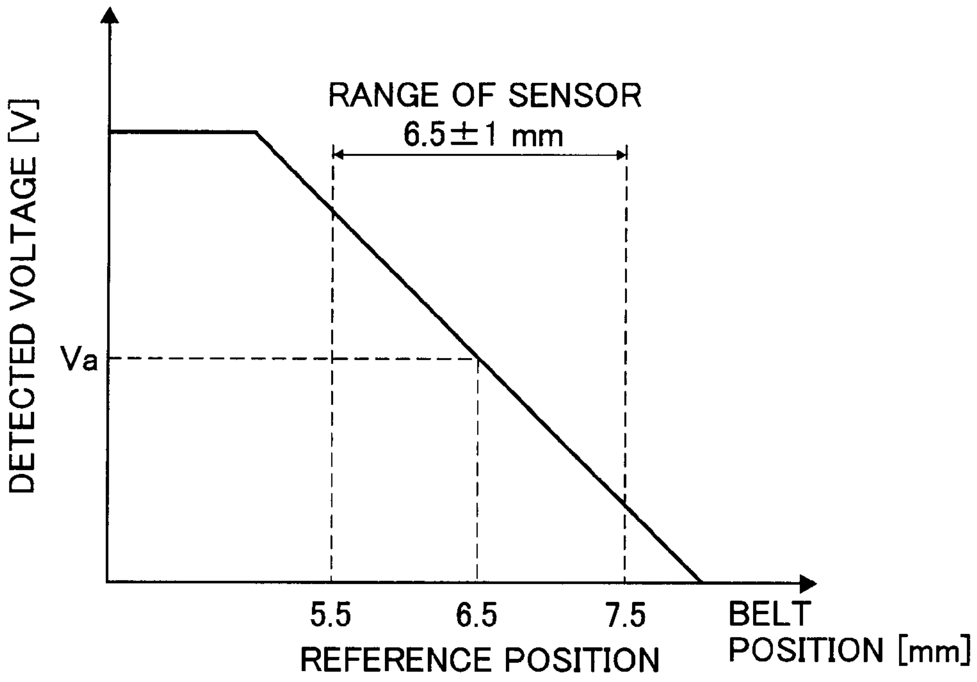
FIG. 5 is a graph for explaining an outline of a characteristic of a displacement detection sensor shown in FIG. 4.
FIG. 6 is a schematic for explaining contents of a belt-position storing table.

The distance between the displacement detection sensor 28 and the member 27*a* is set to a prescribed length, for example, 6.5 millimeters. The contactor 27 swings about the spindle 29 and a distance between the displacement detection sensor 28 and the member 27*a* changes so that an electric signal according to the change is produced. FIG. 5 depicts an example of a characteristic in the displacement detection sensor 28 and a belt position (millimeter) in the lateral axis and detected voltage (V) in the vertical axis. The range of detection of the displacement detection sensor is 6.5 millimeters±1 millimeter, that is, a range of 2 millimeters between 5.5 millimeters and 7.5 millimeters and detecting accuracy is ±10 micrometers.

Figure 7:
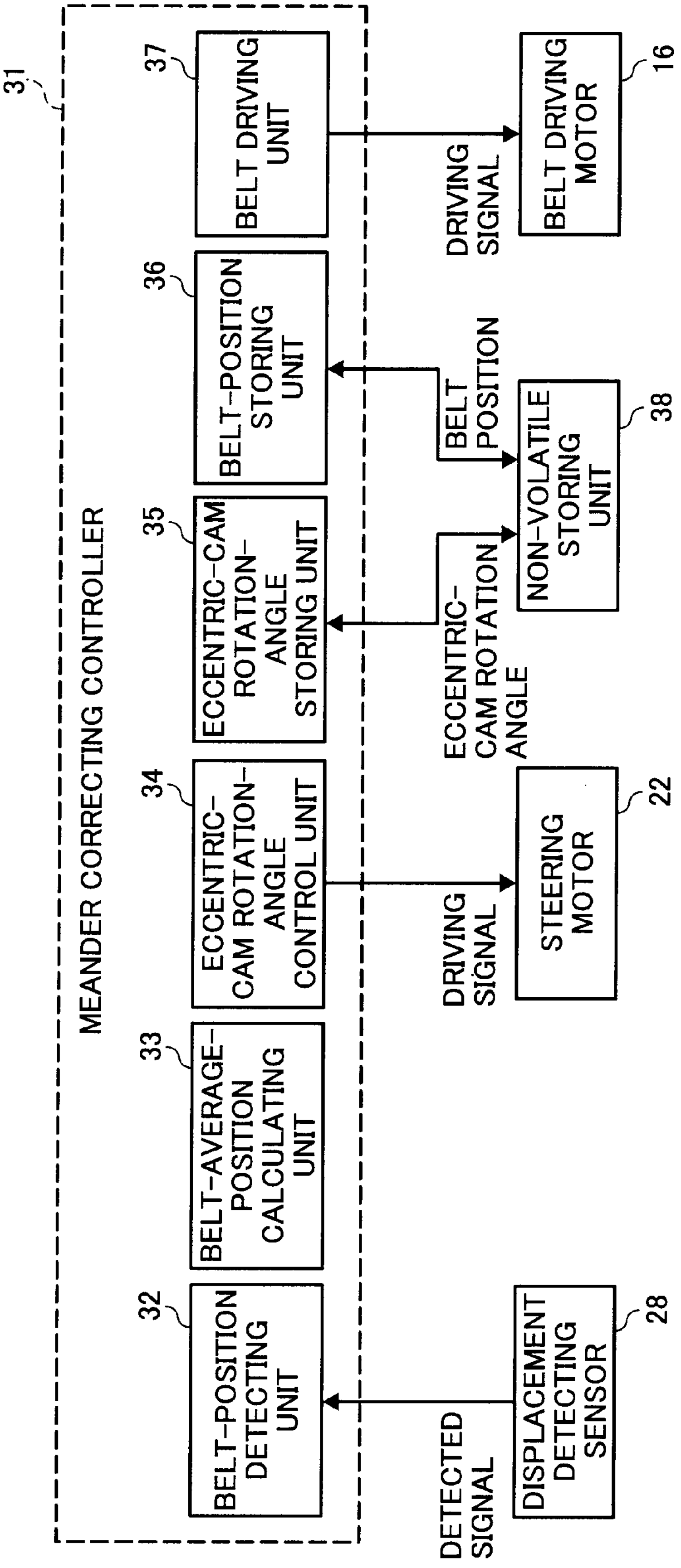
FIG. 7 is a block diagram of a controller according to the embodiment.

FIG. 7 is a functional block diagram of a meander correction controller 31 according to the embodiment. The meander correction controller 31 includes a belt-position detecting unit 32, a belt-average-position calculating unit 33, an eccentric-cam rotation-angle control unit 34, an eccentric-cam rotation-angle storing unit 35, a belt-position storing unit 36, and a belt driving unit 37.

The belt-position detecting unit 32 detects a detected signal from the displacement detection sensor 28 as a position of the belt at a shorter cycle than time for the transfer belt 10 to complete one cycle. For example, when time for the transfer belt to complete one cycle is 4.9 seconds, the detected cycle of the detected signal from the displacement detection sensor 28 is set to 80 milliseconds. Detection of a position of the belt is performed only during driving the transfer belt 10. The belt-position detecting unit 32 stores a position of the belt in a memory such as RAM every time the position of the belt is detected.

An explanation is given below about control of the belt-position detecting unit 32. Belt position data is stored in a memory by taking a difference between a detected signal value Va in the reference position (6.5) in FIG. 5 and the current detected signal value Vb and serving a change of the belt position from the reference position to the operator side as positive and a change of the belt position from the reference position to the counter operator side as negative.

The memory has an area to store belt positions equal to or more than one circle worth of a belt shown in FIG. 6 (hereinafter, a belt-position storing table). As an example, the memory holds an area to store 64 belt positions (belt position data having data equal to or more than one cycle worth of a belt). Belt positions are written sequentially from an area 0 to an area 63. After writing belt position data at the area 63, belt position data is written again from the area 0.

Figure 8:
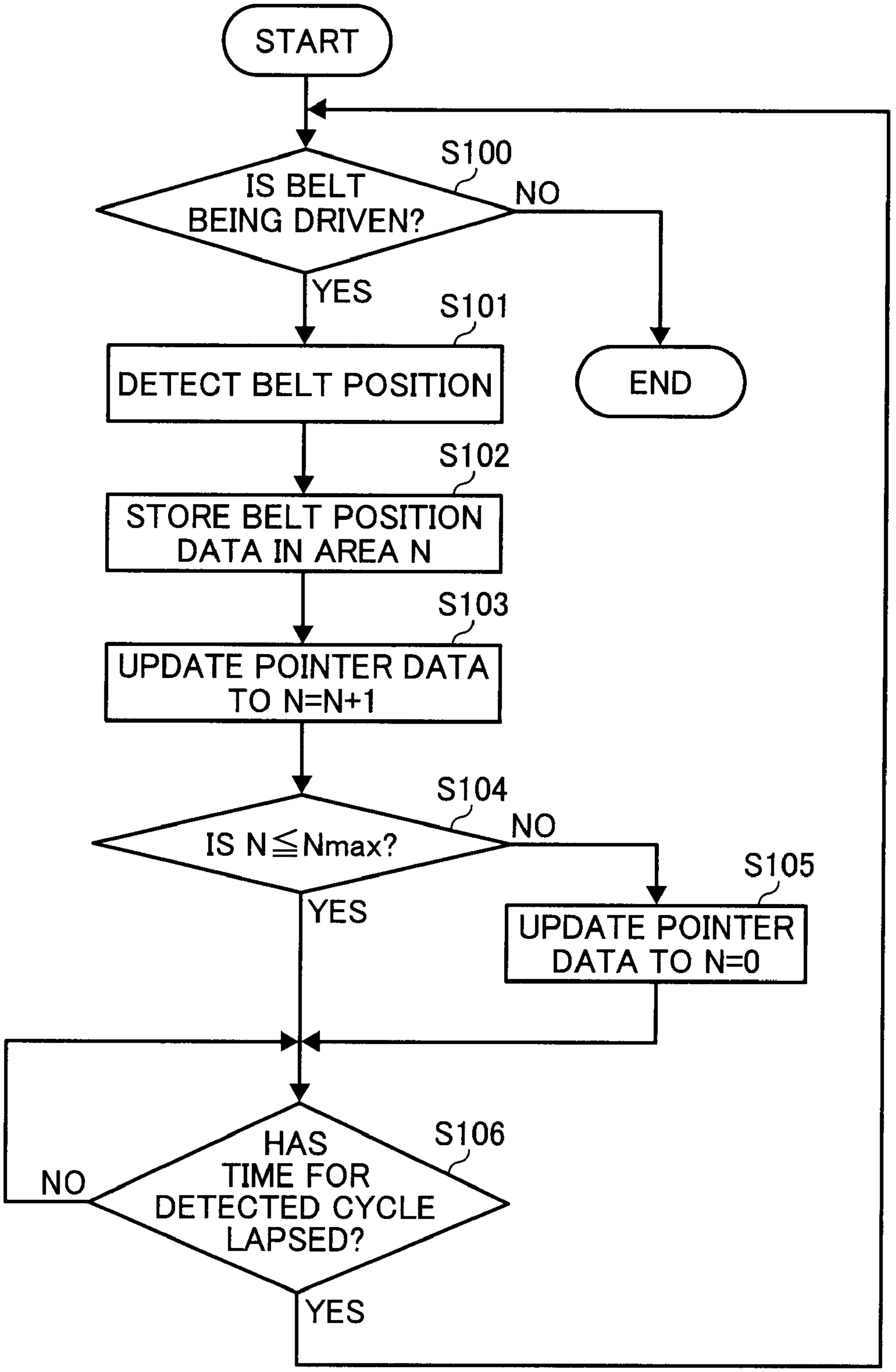
FIG. 8 is a flowchart for explaining a process procedure performed by a belt-position detecting unit according to the embodiment.

The process procedure for storing the belt position data is described in a flowchart of FIG. 8. Here, the belt-position detecting unit has pointer data to indicate an area of storing belt position data next. An initial value of the pointer data is regarded as N and the final area of the belt-position storing table is regarded as Nmax (as an example, Nmax is 63).

First, the belt-position detecting unit 32 determines, to detect the belt position only during driving the transfer belt 10, whether the transfer belt 10 is being driven (step S100). When the transfer belt 10 is being driven, the belt-position detecting unit 32 detects the belt position (step S101). On the other hand, when the transfer belt 10 is not being driven, the processing ends.

After detecting the belt position, belt position data is stored in an area N indicated by pointer data N (step S102). Pointer data N is upgraded to N=N+1 (step S103). Next, it is determined whether N≦Nmax (step S104). When N>Nmax, the pointer data N is updated to N=0 (step S105). Then, waiting for time during which a detected cycle ends (for example, 80 milliseconds) with respect to the detected signal from the displacement detection sensor 28 to lapse (step S106), whether the transfer belt 10 is driven is determined again (step S100).

As described above, the edge of the transfer belt 10 is shaped to be nonlinear and the detected position of the belt changes according to the shape of the edge of the transfer belt 10. Based on procedure of storing a belt position in FIG. 8 the belt-position storing table is a time series of belt positions by successively detecting the shape of the edge of the transfer belt 10. After the transfer belt 10 stops, to detect belt positions stops, which brings, into a standstill, writing of belt position data to the belt-position storing table and update of pointer data.

When the transfer belt 10 starts working again after stop of the transfer belt 10, the belt-position storing table and the pointer data N that are maintained when the transfer belt 10 stops are employed to resume detecting belt positions based on the above-described belt position storing procedure.

The belt-average-position calculating unit 33 in FIG. 7 removes the edge-shaped part of the transfer belt 10 and calculates an amount of meander in the transfer belt 10. The calculating method is known. In Japanese Patent Application Laid-open No. H11-193143, a technology is disclosed that one cycle worth of belt of belt position data is averaged to calculate an amount of meander while driving the belt. As a simple example, in the belt-average-position calculating unit, the belt-position storing table in FIG. 6 is used to calculate a belt average position by Equation 1 every 80 milliseconds of a cycle of detecting the belt position and the resulting value is regarded as an amount of meander.

$$\text{belt average position} = \left(\sum_{j=0}^{j=N\max} \text{belt position data of an area } j\right) \bigg/ (N\max + 1) \tag{1}$$

Conventionally, when the transfer belt 10 stops or starts working, data in the belt-position storing table is reset or pointer data is reset. Therefore, to calculate an amount of meander obtained by removing a displacement component due to the shape of the edge of the transfer belt 10, it takes time for the transfer belt 10 to end a cycle. However, in the belt-position detecting unit 33 of the embodiment, after the transfer belt 10 stops and then when it starts working again, the belt-position storing table is a time series of belt positions that is obtained by successively detecting the shape of the edge of the transfer belt 10. As a result, immediately after startup of the transfer belt 10, the amount of meander obtained by removing a displacement component due to the shape of the edge of the transfer belt 10 can be calculated.

In FIG. 7, the eccentric-cam rotation-angle control unit 34 calculates a rotation angle of the eccentric cam 21 or an angle of inclination of the steering roller 15 corresponding to an amount of correcting meander based on the amount of meander to generate a driving signal to the steering motor 22 at a certain cycle. The method of generating the driving signal is known. For example, the driving signal is generated by a proportional operation or a proportion+integral operation. More specifically, a stepping motor is used as a steering motor 22 and the eccentric cam rotation angle is the number of steps of the steering motor 22 and the driving signal is a clock signal sent to the steering motor 22. A cycle of calculating the eccentric cam rotation angle is shorter than time for the transfer belt 10 to end a cycle, for example, it is set to 500 milliseconds.

The eccentric-cam rotation-angle storing unit 35 stores an eccentric cam rotation angle in a non-volatile storing unit such as non-volatile SRAM (NVSRAM). The eccentric-cam rotation-angle storing unit 35 calculates an angle that changes based on prescribed time of the eccentric cam rotation angle calculated by the eccentric-cam rotation-angle control unit 34. The prescribed time is set to be longer than the cycle of generating the driving signal sent to the steering motor 22, for example, set to time for the transfer belt 10 to travel a half cycle.

The eccentric-cam rotation-angle storing unit 35 calculates a displacement angle θb-θa between an eccentric cam rotation angle θa calculated by the eccentric-cam rotation-angle control unit 34 and an eccentric cam rotation angle θb calculated by the eccentric-cam rotation-angle control unit 34 after the prescribed time. When θb-θa is within a prescribed angle, the eccentric cam rotation angle θb is stored in a non-volatile storing unit 38. On the other hand, when θb-θa is equal to or more than the prescribed angle, the eccentric cam rotation angle θb is not stored in the non-volatile storing unit 38. The prescribed angle is set by evaluating the displacement angle in the eccentric cam rotation angle when the meander velocity of the transfer belt 10 is within a range of allowed meander velocity based on an experiment. However, for example, when the prescribed angle is set to 0° and the eccentric cam rotation angle does not change within and after the prescribed time at all, the eccentric cam rotation angle θb may be stored in the non-volatile storing unit 38.

Upon completion of stopping the transfer belt 10, the belt-position storing table and pointer data that are data of belt positions are stored in the non-volatile storing unit 38. The belt-position storing table and pointer data are stored in the memory and these data are deleted at power-off. Therefore, the belt-position storing table and pointer data are stored in the non-volatile storing unit 38 so that, even when the power is turned on again after power-off, the amount of meander obtained by reducing a displacement component due to the shape of the edge of the transfer belt 10 can be calculated immediately after startup of the transfer belt 10 because the belt-position storing table is a time series of belt positions obtained by successively detecting the shape of the edge of the transfer belt 10. Thus, at the same time when the belt starts to be driven, meander can be corrected based on a correct amount of meander, hence, meander easily arrives at a solution.

An explanation is given about operation sequence when the transfer belt 10 starts working. From an operation of power-on in the image forming apparatus to an initial operation in the belt-conveyor device is explained below as an example and an operation in the belt-conveyor device when the image forming apparatus recovers from error is also performed in the same manner.

Figure 9:
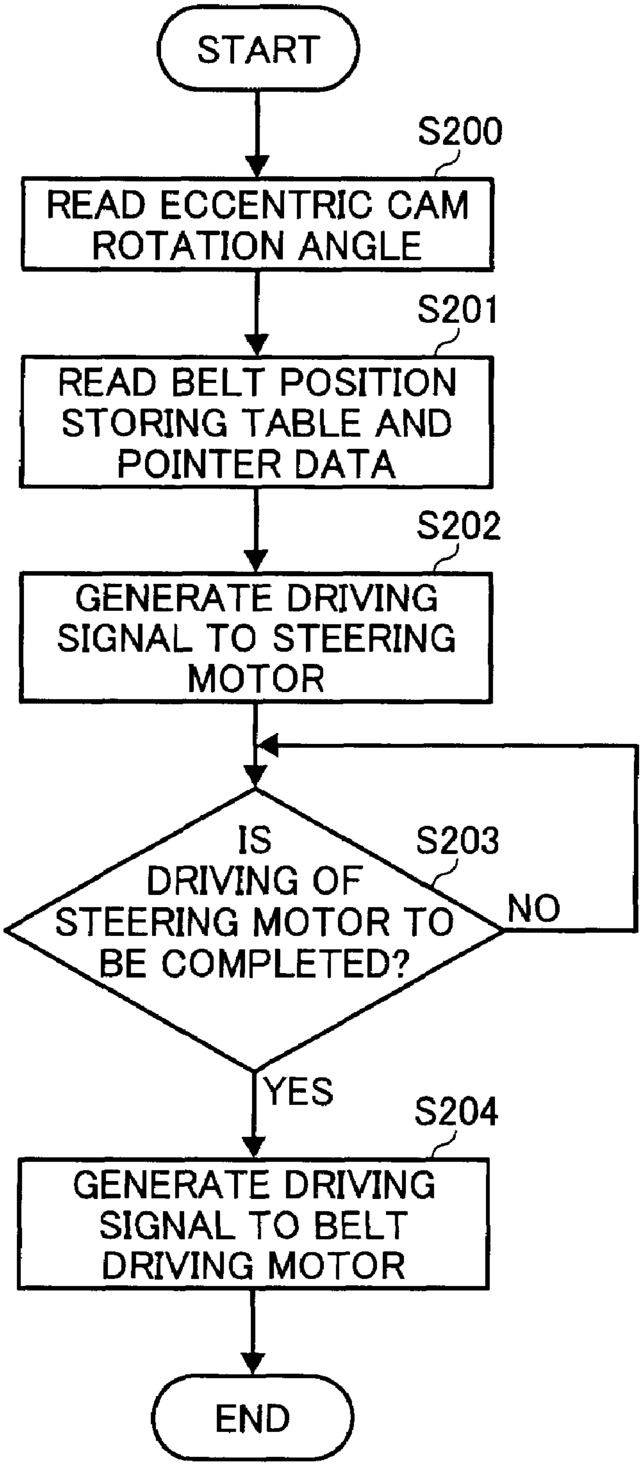
FIG. 9 is another flowchart according to the embodiment.

FIG. 9 is a flowchart of control according to the embodiment. From the power-on to an initial activation of the transfer belt 10 the eccentric cam rotation angle stored in the non-volatile storing unit 38 is read (step S200). Then, the belt-position storing table and the pointer data stored in the non-volatile storing unit 38 are read (step S201).

A driving signal based on the eccentric cam rotation angle read at step S201 is generated and supplied to the steering motor 22 to drive the steering motor 22 (step S202). It is determined whether to complete driving the steering motor 22, wait for the steering motor 22 to complete driving (step S203).

The belt driving unit 37 generates a driving signal and supplies it to the belt driving motor 16 to drive the transfer belt 10 (step S204). After startup of the transfer belt 10, the belt position detection shown in FIG. 8 is started and belt position data newly detected based on read belt-position storing table and pointer data is written in the belt-position storing table.

As described above, from the power-on to the initial operation of the transfer belt 10, after the steering roller 15 is tilted in advance, the transfer belt 10 is started. The belt-position storing table and pointer data stored before power-off are used to calculate a belt average position. Therefore, even when the transfer belt 10 does not end a cycle, an amount of meander obtained by reducing a displacement component due to the shape of the edge of the transfer belt 10 can be calculated. Immediately after startup of the transfer belt 10, the eccentric-cam rotation-angle control unit 34 calculates an eccentric cam rotation angle to correct the meander of the transfer belt 10, generates a driving signal to the steering motor 22, and moves the steering roller 15 in a tilted manner.

As described above, according to the embodiments, meander of the transfer belt 10 can be corrected immediately after startup of the transfer belt 10. It is possible to provide the image forming apparatus that maintains durability of the transfer belt 10 as well as immediately starts high-quality image printing. In addition, a belt home and its detecting unit are not required, compared with an example of providing the belt home, there are advantages: (1) to avoid increasing cost through labeling a mark indicating the belt home on the belt or providing a sensor detecting the mark; (2) there is no likelihood that it takes long time for meander correction to converge on solution because it is impossible to correct meander until the belt home is detected.

According to an aspect of the present invention, it is possible to correct meander of a transfer belt of belt-conveyer device.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A belt-conveyor device that includes an endless belt and a driving unit that drives the endless belt, the belt-conveyor device comprising:

a detecting unit that detects a belt position in a width direction of the endless belt for a plurality of times within more than a cycle of the endless belt, the width direction being a direction orthogonal to direction of travel of the endless belt;

an average calculating unit that calculates an average belt position from the belt positions detected by the detecting unit;

a correction value calculating unit that calculates a correction value that corresponds to the average belt position;

a storing unit that stores therein a plural sets of correction values and belt positions; and a meander correcting unit that corrects meander of the endless belt based on the correction value calculated by the correction value calculating unit, wherein the storing unit stores therein the belt position when the driving unit stops driving the endless belt.

2. The belt-conveyor device according to claim 1, wherein when power of the belt-conveyor device is turned ON, the correcting unit corrects the meander of the endless belt immediately after startup of the driving unit that drives the endless belt.

3. The belt-conveyor device according to claim 1, wherein when starting driving the endless belt, a belt average position is calculated based on belt positions stored in the storing unit and meander correction is immediately started based on the belt average position.

4. The belt-conveyor device according to claim 1, wherein while the driving unit is driving the endless belt, the storing unit stores therein the correcting values when variation of the correction value is within prescribed time and within a prescribed amount.

5. The belt-conveyor device according to claim 1, further comprising a rotatable steering roller on which the endless belt is laid, wherein the meander correcting unit corrects meander of the endless belt by controlling an angle of inclination of the rotatable steering roller based on the belt average position.

6. The belt-conveyor device according to claim 5, wherein the correction value is the angle of inclination of the rotatable steering roller.

7. The belt-conveyor device according to claim 1, wherein the belt position stored in the storing unit when the driving unit stops driving the endless belt remains stored in the storing unit when power of the belt-conveyor device is turned off.

8. The belt-conveyor device according to claim 7, wherein the belt position stored in the storing device when the driving unit stops driving the endless belt remains stored in the storing unit when the power of the belt-conveyor device is turned on after the power of the belt-conveyor device is turned off.

9. A method of correcting meander travel of an endless belt that is driven by a driving unit, the method comprising:

detecting a belt position in a width direction of the endless belt for a plurality of times within more than a cycle of the endless belt, the width direction being a direction orthogonal to direction of travel of the endless belt;

storing the belt position in a storing unit;

calculating an average belt position from the belt positions detected at the detecting;

calculating a correction value that corresponds to the average belt position;

correcting meander of the endless belt based on the correction value that corresponds with the average belt position; and storing the belt position in the storing unit when the driving unit stops driving the endless belt.

10. The method according to claim 9, wherein when power of the driving unit is turned ON, the correcting includes correcting the meander of the endless belt immediately after startup of the driving unit that drives the endless belt.

11. The method according to claim 9, wherein when starting driving the endless belt, a belt average position is calculated based on belt positions stored in the storing device and meander correction is immediately started based on the belt average position.

12. An image forming apparatus that includes a belt-conveyor device that includes an endless belt and a driving unit that drives the endless belt, the belt-conveyor device comprising:

a detecting unit that detects a belt position in a width direction of the endless belt for a plurality of times within more than a cycle of the endless belt, the width direction being a direction orthogonal to direction of travel of the endless belt;

an average calculating unit that calculates an average belt position from the belt positions detected by the detecting unit;

a correction value calculating unit that calculates a correction value that corresponds to the average belt position;

a storing unit that stores therein a plural sets of correction values and belt positions; and a meander correcting unit that corrects meander of the endless belt based on the correction value calculated by the correction value calculating unit, wherein the storing unit stores therein the belt position when the driving unit stops driving the endless belt.

* * * * *